Dec. 25, 1928.
J. C. BLACK ET AL
1,696,377
PROCESS OF PURIFYING HYDROCARBONS
Filed March 17, 1927
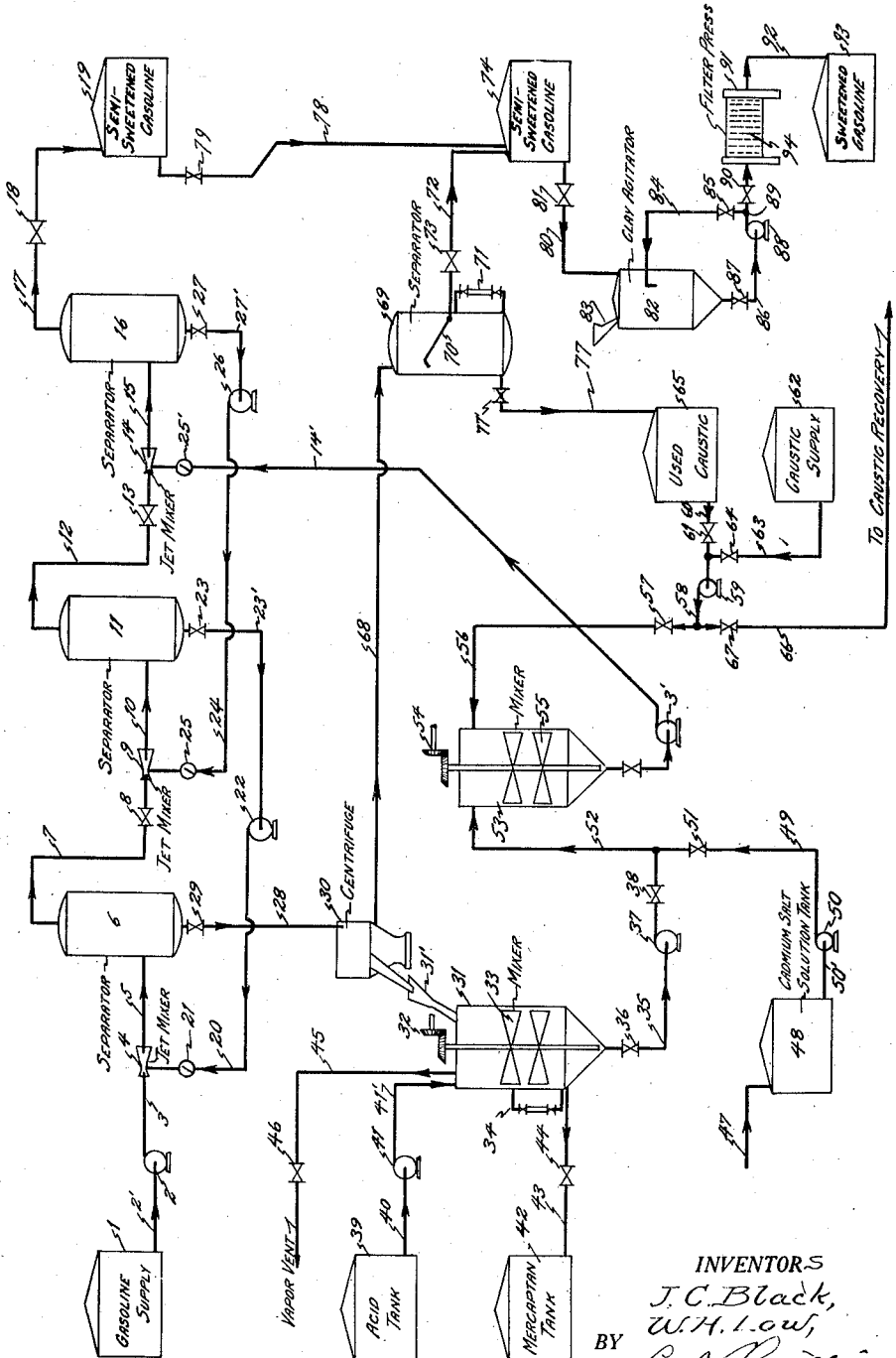
INVENTORS
J. C. Black,
W. H. Low,
BY
ATTORNEY Patented Dec. 25, 1928.

1,696,377

UNITED STATES PATENT OFFICE.

JOHN C. BLACK, OF LOS ANGELES, AND WILSON H. LOW, OF LONG BEACH, CALIFORNIA, ASSIGNORS TO PAN AMERICAN PETROLEUM COMPANY, OF LOS ANGELES, CALIFORNIA, A CORPORATION OF CALIFORNIA.

PROCESS OF PURIFYING HYDROCARBONS.

Application filed March 17, 1927. Serial No. 176,226.

This invention relates to the purification of hydrocarbons, and while not necessarily thereto, it more specifically refers to the treatment of naphtha or gasoline synthetically produced by the cracking of hydrocarbon oils, such as petroleum or shale oils, or distillates derived from a relatively high sulphur bearing crude oil in which free sulphur, hydrogen sulphide, or mercaptans may be formed during said distillation or cracking operation, or present in the final distillate.

One of the principal objects of this invention is to accomplish a desulphurizing and purification of gasoline stock by a sequence of operations to accomplish this purification rapidly and economically.

Another object of the invention is to provide a continuous process or batch system for the extraction of free sulphur, hydrogen sulphide and mercaptans from gasoline stock containing the same, by the employment of a metal hydroxide in an alkaline aqueous suspension, commingling said alkaline aqueous suspension of metallic hydroxide with the gasoline stock under treatment, whereby said free sulphur, hydrogen sulphide and mercaptans combine with the metal of the said metallic hydroxide with the formation of insoluble compounds, and any free sulphur present enters into combination therewith, and then separating the treating agent and products of reaction from the purified gasoline stock.

Another object of the invention is to produce a stable and "sweet" gasoline stock, by treating a gasoline stock which may contain free sulphur, hydrogen sulphide, and mercaptans, commonly called "sour" gasoline stock, with an excess of cadmium hydroxide in an alkaline water suspension, to extract therefrom said free sulphur, hydrogen sulphide and mercaptans in the form of insoluble cadmium compounds, separating the purified gasoline stock from the treating agent containing the insoluble cadmium compounds, then recovering for reuse the cadmium by treating the same with an acid; whereby a water soluble cadmium salt is formed with the liberation of hydrogen sulphide and mercaptans, separating the mercaptans and hydrogen sulphide from the said soluble cadmium salt and adding thereto an excess of sodium hydroxide or other suitable base to reproduce the said cadmium hydroxide for reuse.

The chemical reactions which take place in this step of the said purification process may be expressed as follows:

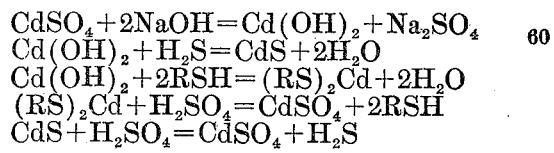

$CdSO_4 + 2NaOH = Cd(OH)_2 + Na_2SO_4$
$Cd(OH)_2 + H_2S = CdS + 2H_2O$
$Cd(OH)_2 + 2RSH = (RS)_2Cd + 2H_2O$
$(RS)_2Cd + H_2SO_4 = CdSO_4 + 2RSH$
$CdS + H_2SO_4 = CdSO_4 + H_2S$

With the foregoing preliminary explanation the preferred embodiment of our invention will now be more fully explained by reference to the accompanying drawing, which is a diagrammatical representation of an apparatus in which the invention may be carried out.

In the drawing, 1 indicates generally a gasoline supply tank containing the stock to be treated, which is connected by a pipe 2' near the bottom and leading into the suction side of a pump 2. Pump 2 discharges the gasoline stock to be treated through a pipe 3 and into a jet mixer 4. Jet mixer 4 is connected to a branch pipe 20, provided with a check valve 21, and leading from the discharge side of a pump 22. The discharge side of jet mixer 4 is connected to a pipe 5 which leads to and is connected to a separator tank 6. Separator tank 6 is connected at the top by a pipe 7, controlled by a valve 8, to the inlet side of a second jet mixer 9. Jet mixer 9 is also connected on the inlet side to a branch pipe 24 containing a check valve 25, which leads from and connects to the discharge side of a pump 26. Jet mixer 9 is connected on the discharge side to a pipe 10, which in turn is connected to a second separator tank 11 near the bottom. Separator tank 11 is connected at the top by a pipe 12 which leads to and connects to the inlet side of a third jet mixer 14 controlled by a valve 13. A branch pipe 14', containing a check valve 25', also is connected to the inlet side of jet mixer 14. Pipe 14' is connected to a pump 3' on the discharge side. Jet mixer 14 is connected on the discharge side to a pipe 15 which is connected to separator 16.

Separator tank 16 is connected to the semi-sweetened gasoline tank 19 by a pipe 17 controlled by a valve 18. Pipe 27', controlled by valve 27, is connected to the pump 26 on the suction side. Pipe 23', controlled by valve 23, is connected to the suction side of pump 22. Pipe 28, controlled by valve 29, connects tank 6 with centrifuge 30. Centrifuge 30 is connected to a mixer tank 31 by a chute 31'. The mixer tank 31 is provided with a stirrer or mixer, with paddles 33, and operated by bevel gears 32 from a shaft which leads to a source of power not shown. Attached to the mixer 31 is a gauge glass 34 by means of which the levels of the liquids in said mixer tanks may be observed. Pipe 43, controlled by valve 44, connects mixer tank 31 with mercaptan tank 42, by means of which the liberated mercaptans may be separated from the chromium salt solution. Pipe 35, controlled by valve 36, connects said mixer tank 31 at the bottom to the suction side of pump 37. A pipe 45, controlled by valve 46, is connected to the said mixer tank 31 at the top for permitting vapors to escape.

39 is an acid tank which is connected by pipe 40 to the suction side of pump 41. Pump 41 discharges into the mixer tank 31 through pipe 41'.

The said centrifuge 30 discharges through a pipe 68, which is connected to a separator tank 69 at the top. The separator tank 69 is provided with a swing pipe 70 controlled by a valve 73, and leads to and connects with a pipe 72, which is connected to semi-sweetened gasoline tank 74 at the top. Pipe 80, controlled by valve 81, connects semi-sweetened gasoline tank 74 to clay agitator 82. 83 is a chute connected to clay agitator 82. Pipe 86, controlled by valve 87, connects clay agitator 82 to the suction side of pump 88. Pipe 89 connects pump 88 on the discharge side to a filter press 91, controlled by a valve 90. Pipe 84, controlled by valve 85, connects said agitator 82 at the top with pipe 89. Pipe 92 connects filter press 91 to sweetened gasoline tank 93. The separator tank 69 is provided with a gauge glass 71, by means of which the level of the liquids may be observed. Connected to and leading from the said separator tank 69 at the bottom is pipe 77, which is connected into the "used caustic" tank 65. The "used caustic" tank 65 is connected to the suction side of a pump 59 by a pipe 60, controlled by the valve 61. The branch pipe 63, controlled by the valve 64, connects the pipe 60 to the "caustic supply" tank 62. The pump 59 discharges into a pipe 58 which is connected to branch pipes 56 and 66, controlled by valves 57 and 67 respectively, the said pipe 66 leading to a caustic recovery plant not shown, and the said pipe 56 being connected to the mixer tank 53 at the top. Mixer tank 53 is provided with a paddle mixer 55 and operated by the bevel gear 54 which leads to a source of power not shown. Connected near the top of mixer tank 53 is a pipe 52, controlled by the valve 51, which connects to the discharge side of a pump 50, by means of the pipe 49. "Cadmium salt solution" tank 48 is connected to the suction side of the pump 50 by the pipe 50'. Said tank 48 is also provided with an inlet pipe 47, which leads to a source of cadmium salt solution not shown.

The preferred process as carried out with the apparatus just described is as follows.

Gasoline or naphtha stock to be treated is discharged by the pump 2 into the jet mixer 4, passing through the pipe 3. At the same time used cadmium hydroxide caustic solution coming from separator tank 11, controlled by valve 23, enters the suction side of the pump 22 and is also discharged into the said jet mixer 4, passing through the pipe 20, which is provided with a check valve 21 to prevent the liquid from returning at any time during the operation. The gasoline or naphtha stock under treatment is commingled in said jet mixer 4 and discharged through the pipe 5 into the separator tank 6. In the separator tank 6 the mixture of gasoline stock and used cadmium hydroxide caustic solution are separated by gravity. The gasoline stock, being partly treated, rises to the top and flows out through the pipe 7 into a second jet mixer 9 controlled by the valve 8.

The now spent used cadmium hydroxide caustic solution which settles to the bottom of separator tank 6 passes into the centrifuge 30 through the pipe 28 controlled by the valve 29. The spent cadmium hydroxide caustic solution, containing insoluble cadmium sulphur compounds, contains a small pecentage of gasoline stock which is separated by means of said centrifuge 30, the gasoline and uncombined caustic soda solution passing through the pipe 68 and into the separator tank 69 where said gasoline is separated from the uncombined caustic solution and drawn into the semi-sweetened gasoline tank 74 through the swing pipe 70, passing through the pipe 72 controlled by the valve 73. The lower level of the separated gasoline can be observed through the gauge glass 71. The uncombined caustic solution passes from the separator tank 69 into a "used caustic" tank 65 through the pipe 77 controlled by the valve 77'.

The partly treated gasoline or naphtha stock coming from the tank 6 through the pipe 7 controlled by the valve 8, passes into a jet mixer 9 where it is again commingled with a once used cadmium hydroxide caustic solution, passing through the pipe 10 and into a second separator tank 11, the said once used cadmium hydroxide caustic solution coming from the separator tank 16 into the suction side of pump 26 and being discharged through the pipe 24 into the said jet mixer 9, said pipe 24 being provided with a check valve 25.

In like manner the gasoline separates from the said once used cadmium hydroxide caustic solution and passes into a third jet mixer 14 through the pipe 12 regulated by the valve 13.

In jet mixer 14 the gasoline stock is again commingled with the recovered cadmium hydroxide caustic solution, containing the required amount of new caustic and new cadmium hydroxide, the new cadmium hydroxide being produced by the introduction of any soluble cadmium salt solution such as cadmium chloride or cadmium sulphate, in the necessary quantities from the tank 48, which is connected to a pump 50 which discharges through the pipes 49 and 52 into the mixer tank 53. The said cadmium salt is converted into cadmium hydroxide by the introduction of an excess of caustic from the tanks 62 and 65, passing from these tanks into the suction side of pump 59 and being discharged through the pipe 56, controlled by the valve 57, into the said mixer tank 53. As soon as the required amounts of caustic solution and cadmium salt solution have been introduced into the said mixer tank 53, the same is agitated by the mechanical mixer 55 until the reaction is complete.

In jet mixer 14 the final treatment of the gasoline stock is made by commingling the same with the recovered and new cadmium hydroxide caustic solution coming from the said mixer 53, and is then discharged into the third separator tank 16, passing through pipe 15. The treated gasoline stock in separator 16 separates from the once used cadmium hydroxide caustic solution, passes up through said separator tank 16 through the pipe 17, controlled by the valve 18, and into the semi-sweetened gasoline tank 19. The once used cadmium hydroxide caustic solution settles out by gravity from the sweetened gasoline stock and passes into the suction side of pump 26 and then, as heretofore stated, is discharged into the jet mixer 9 to be used again in counterflow treatment.

The spent cadmium hydroxide caustic solution, which has been used three times, contains certain percentages of gasoline stock. As heretofore stated, this emulsified gasoline stock is separated from the said spent cadmium hydroxide caustic solution by a centrifugal operation in the centrifuge 30. The excess cadmium hydroxide, and insoluble cadmium sulphur compounds separated by centrifugal action, pass down the chute 31' into the mixer 31, and the uncombined caustic solution passes through the pipe 68 along with the entrained gasoline stock and into the separator tank 69, where said gasoline is separated by gravity from the uncombined caustic solution, as heretofore stated.

The insoluble sulphur compounds of cadmium are now in a solid form in the tank 31. A sufficient amount of acid, such as hydrochloric or sulphuric, is now introduced into the said mixer tank 31 from the acid tank 39, passing through line 40 into the suction side of pump 41 and being discharged into the said mixer. The acid is commingled with the said insoluble cadmium sulphur compounds until the reaction is completed, which is as follows:

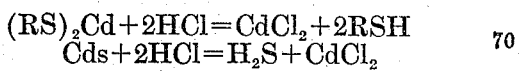

$$(RS)_2Cd + 2HCl = CdCl_2 + 2RSH$$
$$Cds + 2HCl = H_2S + CdCl_2$$

As soon as the reaction is complete the mechanical agitation is stopped and the mixture is allowed to remain at rest until the liberated mercaptans separate from the cadmium salt solution, the mercaptans rising to the top and the hydrogen sulphides being given off as a gas. The cadmium salt solution is now drawn off to the level at which pipe 43 enters the said mixer, through pipe 35 and into the suction side of pump 37, controlled by the valve 36, the said pump 37 discharging the recovered cadmium salts in a water solution through the pipe 52 and into the mixer 53, where the same is used again, a sufficient amount of new solution of cadmium salts being employed to make up for any losses that occur. The liberated mercaptans contained in the tank 31 are drawn off into the mercaptan tank 42, through the pipe 43 controlled by the valve 44, the level being observed by the gauge glass 34. During the conversion of the cadmium mercaptans and cadmium sulphide into the soluble salts, hydrogen sulphide is evolved as heretofore stated. This hydrogen sulphide passes out through the vapor vent pipe 45, controlled by the valve 46.

At regular intervals a portion of the used caustic in tank 65 is removed to a caustic recovery plant, not shown, through the pipe 60 and 66 controlled by valves 61, 67 and pump 59. The partly spent caustic liquor is evaporated to such a degree that the sodium chloride or sodium sulphate crystallizes and the mother liquor containing the non-spent caustic is returned to the system.

The semi-sweetened gasoline stock, contained in the tanks 19 and 74, may contain a small percentage of suspended colloidal cadmium mercaptans and a small amount of coloring matter, which are removed by further treatment with a decolorizing agent, such as fuller's earth, acid treated montmorillonite, a decolorizing agent of the serpentine division or other decolorizing agents known in the art. This decolorizing treatment and separation of the cadmium sulphide is accomplished by agitating the said semi-sweetened gasoline with the required percentage of decolorizing agent in the agitator 82, the clarifying and decolorizing agent being introduced through the chute 83, and the agitation being accomplished by circulation of the stock from the said agitator 82 by means of pump 88, which circulates the gasoline stock through the pipe 86 and discharges into said agitator 82, through the pipe 84, controlled by valves 87 and 85. As soon as the semi-sweetened gasoline stock is completely commingled with the decolorizing agent valve 90 is opened and valve 85 is closed, which permits the commingled gasoline stock and decolorizing agent to pass through the filter press 91, whereby the decolorizing agent containing the adsorbed coloring matter and cadmium compounds are separated from the gasoline stock, the said gasoline stock passing through the pipe 92 and into the sweetened gasoline tank 93. The finished gasoline stock in tank 93 will now be "sweet" to the "doctor test".

It is to be understood that any hydroxide capable of forming cadmium hydroxide may be employed, also that any petroleum stock may be treated by this method for the removal of any sulphur bodies having the general formula RSH in which R may be hydrogen or any organic radical.

As a specific example, in the treatment of gasoline stocks derived from cracking California petroleum oil distillates, it was found that the amount of cadmium hydroxide necessary to remove all the mercaptans, hydrogen sulphide, and free sulphur present ranged from ¼ to 1½ pounds, calculated to cadmium oxide, per barrel of gasoline stock treated, the cadmium hydroxide being formed by adding to a water solution of cadmium chloride or sulphate, an excess of a water solution of caustic soda, so that all the cadmium was converted into cadmium hydroxide and remained suspended in the caustic alkaline water solution.

By the term "sour" we mean a petroleum oil containing mercaptans, hydrogen sulphide, and by the term "sweet" we mean a petroleum oil substantially free from the above named sulphur constituents.

By the term "doctor test" we mean that well known test employed by chemists to determine a "sour" or "sweet" petroleum oil stock, the term negative to "doctor test" meaning that the oil stock is "sweet", and positive to "doctor test" meaning that the oil stock is "sour".

It is also to be understood that any gasoline stock or petroleum oil distillate may be treated by our invention and rendered "sweet", and that any petroleum oil distillate may or may not have had prior treatments known in the art, such as treatments with acid and caustic soda, before being "sweetened" by our invention.

It is also to be understood that this invention may be employed for the purification of any caustic solution which contains dissolved sulphur bearing constituents, such as mercaptans and hydrogen sulphide, and that such purification may be made by adding thereto a sufficient amount of a suitable cadmium compound, such as, cadmium chloride, cadmium sulphate, cadmium hydroxide and the like, and then separating the solid cadmium sulphur compounds from the caustic solution.

While the process herein described is well adapted for carrying out the objects of the present invention, it is understood that various modifications may be made without departing from the invention and the invention includes all such modifications and changes as come within the scope of the appended claims.

We claim:

1. The process of treating hydrocarbons, which comprises treating the same with cadmium hydroxide suspended in an aqueous solution in quantities sufficient to combine with sulphur bearing constituents to be separated, combining the same therein, and separating the treated hydrocarbons from the sulphur bearing constituents combined with the said cadmium hydroxide.

2. The process of purifying hydrocarbons, which comprises treating the same with cadmium hydroxide suspended in an aqueous solution in quantities sufficient to combine with the sulphur bearing constituents to be separated, separating the treated hydrocarbons from the cadmium hydroxide combined with said sulphur bearing constituents, and then separating the sulphur bearing constituents from the cadmium hydroxide and returning said cadmium in the form of a hydroxide free of said combined sulphur bearing constituents into the system for reuse.

3. A process of treating hydrocarbons, which consists in treating the same with cadmium hydroxide suspended in a water solution of an alkali, in quantities sufficient to combine with the sulphur bearing constituents to be separated, combining the same therein, and separating the treated hydrocarbons from the sulphur bearing constituents combined with said cadmium hydroxide.

4. A process of treating hydrocarbons, which consists in treating the same with cadmium hydroxide suspended in a water solution of sodium hydroxide, in quantities sufficient to react with the sulphur bearing constituents to be separated to form insoluble sulphur cadmium compounds, combining the same therein, and separating the treated hydrocarbons from the sulphur bearing constituents combined with said cadmium.

5. The process of purifying hydrocarbons, which consists in treating the same with cadmium hydroxide suspended in a water solution of sodium hydroxide, in quantities sufficient to combine with the sulphur bearing constituents to be separated, separating the treated hydrocarbons from the insoluble cadmium compounds, and then separating the sulphur bearing constituents from the cadmium and returning said cadmium in the form of a hydroxide free of said combined sulphur bearing constituents into the system for reuse.

6. A process of purifying hydrocarbons, which consists in treating the same with cadmium hydroxide in a water solution of an alkali, in quantities sufficient to combine with sulphur bearing constituents to be separated, separating the treated hydrocarbons from the cadmium combined with the sulphur bearing constituents, separating the sulphur bearing constituents from the cadmium compounds by the addition of an acid capable of forming a water soluble salt, separating the water soluble cadmium salt from the sulphur bearing constituents, reforming the cadmium hydroxide which was separated from the sulphur bearing constituents by the addition of a water soluble base, and returning the same to the system.

7. The process of treating gasoline stock derived from cracking high boiling petroleum oils, which consists in treating the same continuously in steps by a counter-flow treatment with cadmium hydroxide suspended in a water solution of caustic soda, in quantities sufficient to combine with substantially all the mercaptans, hydrogen sulphide and uncombined sulphur present, combining the same therein, and separating the treated gasoline stock from the cadmium hydroxide combined with the said mercaptans, hydrogen sulphide, sulphur, and water solution of caustic soda.

8. The process of treating gasoline stock derived from cracking high boiling petroleum oils, which consists in treating the same continuously in steps by a counter-flow treatment with cadmium hydroxide suspended in a water solution of caustic soda, in quantities sufficient to combine with substantially all the mercaptans and hydrogen sulphide present, combining the same therein, separating the treated gasoline stock from the combined sulphur bearing constituents, and separating said sulphur constituents from the cadmium compounds by the addition of acid, re-forming the cadmium hydroxide and returning the same to the system suspended in a water solution of caustic soda.

9. The process of treating gasoline stock derived from cracking high boiling petroleum oils, which consists in treating the same continuously in steps by a counter-flow treatment with cadmium hydroxide suspended in a water solution of caustic soda, in quantities sufficient to combine with substantially all the mercaptans, hydrogen sulphide and uncombined sulphur present, combining the same therein, and separating the treated gasoline stock from the cadmium hydroxide combined with the said mercaptans, hydrogen sulphide, sulphur, and water solution of caustic soda, and then separating the sulphur bearing constituents from the cadmium compounds by the addition of an acid capable of forming a water soluble salt with said cadmium compounds, separating the cadmium salt formed therein, re-forming the cadmium hydroxide by the addition of caustic soda and returning the same to the system.

10. The process of treating gasoline stock derived from cracking high boiling petroleum oils, which consists in treating the same continuously in steps by a counter-flow treatment with cadmium hydroxide suspended in a water solution of caustic soda, in quantities sufficient to combine with substantially all the mercaptans and hydrogen sulphide present, combining the same therein, and separating the treated gasoline stock from the cadmium hydroxide combined with the said mercaptans, hydrogen sulphide, and water solution of caustic soda, and then separating the sulphur bearing constituents from the cadmium compounds by the addition of an acid capable of forming a water soluble salt with said cadmium compounds, separating the cadmium salt formed therein, re-forming the cadmium hydroxide by the addition of caustic soda and returning the same to the system, and then clarifying, decolorizing and removing any cadmium compounds from said treated gasoline stock.

11. A continuous process of treating a hydrocarbon oil which is "sour" to the "doctor test" to render the same "sweet", and which will after said treatment shown a "negative doctor test", which consists in treating the same with cadmium hydroxide suspended in a water solution of caustic soda, in quantities sufficient to combine with sulphur bearing constituents to be separated, separating the treated hydrocarbons from the insoluble cadmium compounds and water solution of caustic soda combined with said constituents, and then separating the said sulphur bearing constituents from the cadmium compounds and water solution of caustic soda, and returning said cadmium in the form of a hydroxide free of said sulphur bearing constituents into the system for reuse.

In testimony whereof we affix our signatures.

JOHN C. BLACK.
WILSON H. LOW.